United States Patent
Hernandez et al.

[19]

[11] Patent Number: 5,877,364
[45] Date of Patent: *Mar. 2, 1999

[54] PROCESS FOR THE SIMULTANEOUS SELECTIVE HYDROGENATION OF DIOLEFINS AND NITRILES IN MULTIPLE REACTOR UNITS

[75] Inventors: Zaida Hernandez; Wolfgang Garcia, both of Miranda; Magdalena Ramirez de Agudelo, Los Teques, all of Venezuela

[73] Assignee: Intevep, S.A., Caracas, Venezuela

[ * ] Notice: The term of this patent shall not extend beyond the expiration date of Pat. No. 5,817,589.

[21] Appl. No.: 934,030

[22] Filed: Sep. 19, 1997

Related U.S. Application Data

[63] Continuation-in-part of Ser. No. 631,605, Apr. 2, 1996, Pat. No. 5,817,589, and a continuation-in-part of Ser. No. 902,183, Jul. 29, 1997, abandoned, which is a continuation of Ser. No. 585,950, Jan. 16, 1996, Pat. No. 5,663,446, which is a division of Ser. No. 354,969, Dec. 13, 1994, Pat. No. 5,523,271.

[51] Int. Cl.$^6$ .......................... C07C 5/03; C07C 209/00; C07C 17/20; B01J 209/00
[52] U.S. Cl. .......................... 585/262; 585/259; 502/34; 502/53; 564/490; 570/260
[58] Field of Search .................................. 585/259, 262; 502/20, 34, 53; 564/490; 570/260

*Primary Examiner*—Glenn Caldarola
*Assistant Examiner*—In Suk Bullock
*Attorney, Agent, or Firm*—Bachman & LaPointe, P.C.

[57] ABSTRACT

A process is provided for simultaneous selective hydrogenation of diolefins and nitriles from a hydrocarbon feedstock, wherein hydrogenation is carried out using a catalyst in one reactor zone while partially deactivated catalyst in another reactor zone is regenerated.

19 Claims, 3 Drawing Sheets

5,877,364

PROCESS FOR THE SIMULTANEOUS SELECTIVE HYDROGENATION OF DIOLEFINS AND NITRILES IN MULTIPLE REACTOR UNITS

CROSS-REFERENCE TO RELATED APPLICATIONS

This application is a continuation-in-part of copending U.S. patent application Ser. No. 08/631,605, filed Apr. 2, 1996, now U.S. Pat. No. 5,817,589, and is also a continuation-in-part of co-pending U.S. patent application Ser. No. 08/902,183, filed Jul. 29, 1997, now abandoned, which is a continuation of U.S. patent application Ser. No. 08/585,950, filed Jan. 16, 1996, now U.S. Pat. No. 5,663,446 which is a Divisional of U.S. patent application Ser. No. 08/354,969, filed Dec. 13, 1994, now U.S. Pat. No. 5,523,271.

BACKGROUND OF THE INVENTION

The invention relates to a process for simultaneous selective hydrogenation of diolefins and nitriles using a plurality of reactors or reactor zones.

There are known in the art processes and catalysts for hydrogenating unsaturated compounds in liquid hydrocarbon feedstocks. U.S. Pat. Nos. 4,152,351, 4,271,323 and 4,734,540 each disclose processes whereby particular elements of a hydrocarbon feedstock are hydrogenated.

It is particularly desirable to hydrogenate diolefin and nitrile contaminants which may be present in hydrocarbon feedstocks. During the course of treatment of feedstocks for hydrogenation of diolefins and nitriles, however, the catalysts employed in the process gradually become spent or deactivated. Conventionally, the catalyst must be withdrawn from the reaction bed or other apparatus used during treatment so as to replace and/or regenerate the catalyst. This results in significant delays of the hydrogenation process.

The need remains for a method or process of regenerating a spent or partially spent catalyst which reduces the delays of the hydrogenation process.

It is therefore the primary object of the present invention to provide a process for regenerating a hydrogenation catalyst.

It is a further object of the present invention to provide a process for regenerating a hydrogenation catalyst wherein the catalyst is regenerated in the hydrogenation reactor bed.

It is a still further object of the present invention to provide a process for regenerating a hydrogenation catalyst wherein the catalyst is regenerated to a substantial level with respect to original activity.

It is another object of the present invention to provide a process for treating a feedstock including diolefin and nitrile fractions, wherein the catalyst is regenerated in the reaction bed when deactivated to a certain level.

It is still another object of the present invention to provide a process for treating a feedstock such as an FCC feedstock in multiple reactor zones wherein the catalyst in one zone is regenerated while another zone is used to treat feedstock.

Other objects and advantages of the present invention will appear hereinbelow.

SUMMARY OF THE INVENTION

In accordance with the present invention, the foregoing objects and advantages are readily attained.

In accordance with the invention, a process is provided for simultaneous selective hydrogenation of diolefins and nitrites from a hydrocarbon feedstock, which process comprises the steps of: (a) providing a hydrocarbon feedstock having a diolefin content of greater than or equal to about 0.1 wt % and a nitrile content of greater than or equal to about 2 ppm; (b) providing at least a first and second reactor zone each containing a catalyst comprising a support material selected from the group consisting of inorganic oxide-zeolite composite, carbon and zeolite, and a catalytically active metal phase selected from the group consisting of partially reduced group IB metals and completely reduced group VIII metals, said metal phase being present in an amount of greater than or equal to about 0.03 wt %, said catalyst having an initial diolefin hydrogenation activity and said catalyst in said second reactor zone having a reduced diolefin hydrogenation activity; (c) mixing said feedstock with hydrogen to provide a reaction feedstock having a ratio of hydrogen to diolefins and nitriles of less than about 3 times a stoichiometric amount required to selectively hydrogenate said diolefins and said nitriles; (d) treating said reaction feedstock in the presence of said catalyst in said first reactor zone at hydrogenation temperature and pressure until said catalyst in said first reactor zone has a reduced diolefin hydrogenation activity not less than about 50% of said initial diolefin hydrogenation activity; (e) flushing said catalyst in said second reactor zone with an inert gas so as to remove traces of hydrocarbon from said catalyst and thereby provide a flushed catalyst in said second reactor zone; (f) regenerating said flushed catalyst in said second reactor zone by further flowing said flushed catalyst with hydrogen so as to provide a regenerated catalyst in said second reactor zone having a regenerated diolefin hydrogenation activity which is greater than said reduced diolefin hydrogenation activity; (g) treating said reaction feedstock in the presence of said catalyst in said second reactor zone at hydrogenation temperature and pressure; until said catalyst has a reduced diolefin hydrogenation activity not less than about 50% of said initial diolefin hydrogenation activity; (h) flushing said catalyst in said first reactor zone with an inert gas so as to remove traces of hydrocarbon from said catalyst and thereby provide a flushed catalyst in said first reactor zone; (i) regenerating said flushed catalyst in said first reactor zone by further flowing said flushed catalyst with hydrogen so as to provide a regenerated catalyst in said first reactor zone having a regenerated diolefin hydrogenation activity which is greater than said reduced diolefin hydrogenation activity; and (j) repeating steps (d) through (i).

In further accordance with the invention, the process as set forth above is preferably carried out until said spent diolefin hydrogenation activity is reduced to not less than about 50% of initial diolefin hydrogenation activity, at which point the flushing and regenerating steps carried out and repeated as desired.

Still further in accordance with the invention, the process includes regenerating the hydrogenation catalyst to a hydrogenation activity of at least about 90% of the initial diolefin hydrogenation activity of the catalyst.

BRIEF DESCRIPTION OF THE DRAWINGS

A detailed description of preferred embodiments of the invention follows, with reference to the attached drawings, wherein.

DETAILED DESCRIPTION

Figure 2:
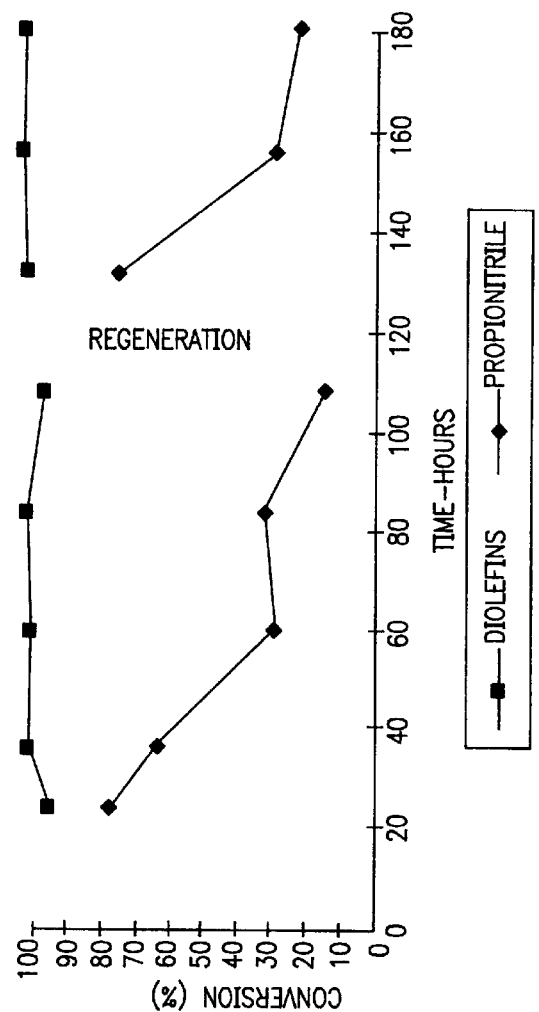
FIG. 2 illustrates the conversion or activity of a catalyst over time, and after regeneration in accordance with the process of the present invention.

The invention relates to a process for regenerating a spent hydrogenation catalyst, preferably in a hydrogenation reactor, so as to avoid the necessity of catalyst removal and/or replacement, and also to a process for simultaneous and selective hydrogenation of a C4/C5 feedstock using multiple reactor zones and the process for regeneration.

A preferred catalyst for simultaneous and selective hydrogenation of diolefins and nitriles present in a hydrocarbon feedstock comprises a support material preferably selected from the group consisting of an inorganic oxide-zeolite composite, carbon and zeolite, with a catalytically active phase deposited on the support material which is preferably selected from the group consisting of partially reduced group IB metals and completely reduced group VIII metals, wherein the catalytically active metal phase is preferably present in an amount of greater than or equal to about 0.03 wt %. These and other catalysts, when used for the hydrogenation of diolefins and nitriles, become deactivated during use to the point where the catalyst must be discarded and/or regenerated. In accordance with the present invention, a process is provided for regenerating a spent or at least partially spent or deactivated hydrogenation catalyst.

According to the invention, a hydrogenation catalyst used for treating a hydrocarbon feedstock having diolefins and nitriles, for example greater than or equal to about 0.1% diolefin and grater than or equal to about 2 ppm nitrile, is monitored, particularly with respect to the activity of the catalyst toward the desired hydrogenation reactions. When the activity for diolefins hydrogenation of the catalyst reaches a particular level, preferably not less than about 50% of original activity, more preferably not less than about 70% of original activity, and most preferably not less than about 80% of original activity, the feed of hydrocarbon to the catalyst material is temporarily interrupted, and the deactivated catalyst is treated first by flushing with an inert gas so as to remove traces of hydrocarbon from the catalyst, and then with a reducing gas in a regenerating step so as to provide a regenerated catalyst having a regenerated hydrogenation activity.

In further accordance with the present invention, catalyst as set forth above may be provided in a plurality of reactors or reactor zones such as adsorption-reactive units and the like, and hydrogenation can be carried out in a first reactor zone while the regeneration process of the present invention is carried out, preferably substantially simultaneously, in a second or different reactor zone. In accordance with this embodiment of the invention, advantageously, one reactor zone can be used for processing feedstock while the other is regenerated, and vice versa, thereby avoiding periods of down time during the regeneration process.

According to the invention, the treatment or flushing of the catalyst with inert gas is preferably carried out using an inert gas selected from the group consisting of nitrogen, helium, argon, methane, ethane, propane, hydrogen or other light saturated hydrocarbon and mixtures thereof, preferably nitrogen, helium, argon and light saturated hydrocarbon, and most preferably nitrogen. Flushing the deactivated catalyst with inert gas in accordance with the invention advantageously serves to remove traces of hydrocarbons from the catalyst and to thereby provide a flushed catalyst which can then be regenerated by hydrogen flushing in accordance with the invention. It should be noted that this gas is said to be inert with respect to the catalyst.

After flushing with inert gas, according to the invention, the catalyst is then preferably further flushed during a regeneration step with reducing gas such as hydrogen so as to recover a large portion, preferably at least about 90%, of original or initial catalyst activity.

In accordance with the process of the present invention, the flushing and regenerating steps using inert gas and reducing gas are preferably carried out in the hydrogenation reactor so that the catalyst to be regenerated does not need to be removed therefrom. Further, and advantageously, the flushing and regenerating steps of the present invention are carried out at temperatures and pressures in the reactor which are similar to the hydrogenation reaction, so as to provide a still further reduced interruption or disruption in the hydrogenation reaction.

Figure 1:
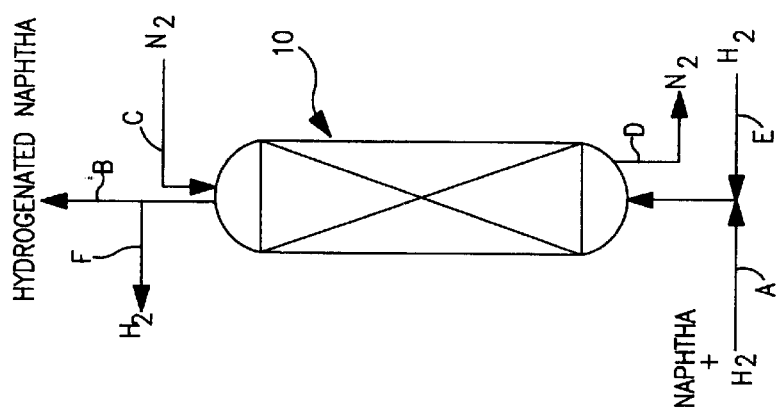
FIG. 1 shows a schematic illustration of a process according to the present invention.

Referring now to FIG. 1, the catalyst regeneration process of the present invention will be further described. The hydrogenation reaction is typically carried out in a reactor, generally referred to in the drawings by reference numeral 10. The hydrogenation catalyst is disposed within reactor 10. During normal operation, a reaction feedstock comprising the feedstock to be treated and a hydrogen source are fed to reactor 10 as schematically illustrated by arrow A. The reaction feedstock is contacted with the hydrogenation catalyst in reactor 10 so as to provide a hydrogenated product exiting reactor 10 as shown by arrow B.

When the activity of the hydrogenation catalyst within reactor 10 decreases to a desired or pre-specified level, feed of the reaction feedstock along arrow A is stopped, and a nitrogen flow is introduced to reactor 10. As shown in the drawing, nitrogen is preferably fed to reactor 10 in a direction opposite to the flow of feedstock during hydrogenation reactions. In the drawing of FIG. 1, and most typically, reaction feedstock is fed to reactor 10 in an up-flow direction. Thus, preferably, nitrogen is fed to reactor 10 as schematically illustrated by arrow C in an opposite direction of flow with respect to feed, namely a down-flow direction. Nitrogen is shown exiting reactor 10 at arrow D.

Nitrogen flow in accordance with the invention is conducted so as to remove traces of hydrocarbons from the hydrogenation catalyst within reactor 10, thereby preparing the catalyst for a subsequent regeneration step in accordance with the invention. Nitrogen is preferably flushed through reactor 10 at a space velocity and surface velocity sufficient to remove such traces of hydrocarbon. In accordance with a preferred embodiment of the invention, nitrogen may preferably be fed to reactor 10 at a space velocity of between about 100 to about 1000 $h^{-1}$, preferably about 500 $h^{-1}$ as measured at standard pressure, and temperature conditions. Nitrogen is also preferably fed at a surface velocity of between about 50 to about 150 m/min as measured at standard pressure, and temperature conditions. Nitrogen flow is preferably carried out in the reactor at a temperature of less than about 300° C., preferably between about 150° C. to about 300° C., and most preferably between about 200° C. to about 290° C.

Once traces of hydrocarbon have been sufficiently removed, nitrogen flow in the direction of arrows C and D is stopped, and a hydrogen flow is introduced into reactor 10, preferably in a direction opposite to the direction of nitrogen. Thus, as shown in FIG. 1, hydrogen is preferably introduced in the direction schematically illustrated as arrow E, and exits reactor 10 in a direction of arrow F. Hydrogen flow is preferably carried out under reactor pressure and temperature conditions similar to those of the hydrogenation reaction. Preferably, hydrogen flow is carried out at a pressure of 150–650 psig, preferably between about 200 to about 300 psig, a temperature of between about 100°–300° C., and at a space velocity of between about 20 $h^{-1}$ to about 200 $h^{-1}$.

Hydrogen is preferably passed through reactor 10 so as to expose the hydrogenation catalyst therein to between about 5 to about 20 times the amount of hydrogen required to totally reduce the metal phase of the hydrogenation catalyst. In accordance with the invention, this advantageously results in the regeneration of the hydrogenation catalyst within reactor 10 to a regenerated hydrogenation activity of at least about 90% of the original activity. Upon completion of the catalyst regeneration, hydrogen flow in the direction of arrows E–F is stopped, and reactor 10 is again placed on line by again feeding reaction feedstock along arrow A so as to obtain hydrated or otherwise treated feedstock at the reactor exit as shown in arrow B.

As set forth above, the regeneration process is preferably carried out in the reactor at similar temperature and pressure conditions to those of the hydrogenation process. In this regard, a typical hydrogenation process may be carried out at temperatures of between about 60° to about 160° C. or higher, and pressures of between about 200 to about 400 psig. Thus, advantageously, the regeneration process can be started as soon as feed to the reactor is stopped without requiring delays for adjusting temperature or pressure in the reactor.

In accordance with the invention, it has been found that the inert gas or nitrogen flushing step in accordance with the invention is critical in obtaining regeneration of the hydrogenation catalyst in accordance with the invention. Also as set forth above, it has been found to be advantageous to flow the nitrogen and hydrogen sequentially in opposite directions to one another so as to provide enhanced regeneration of the hydrogenation catalyst. In this regard, and as illustrated in FIG. 1, nitrogen flow may therefore be carried out in a direction opposite to normal feed, while hydrogen is carried out in a direction parallel to normal feed. Of course, the direction of nitrogen and hydrogen flow could be reversed, if desired, in accordance with the invention.

Figure 5:
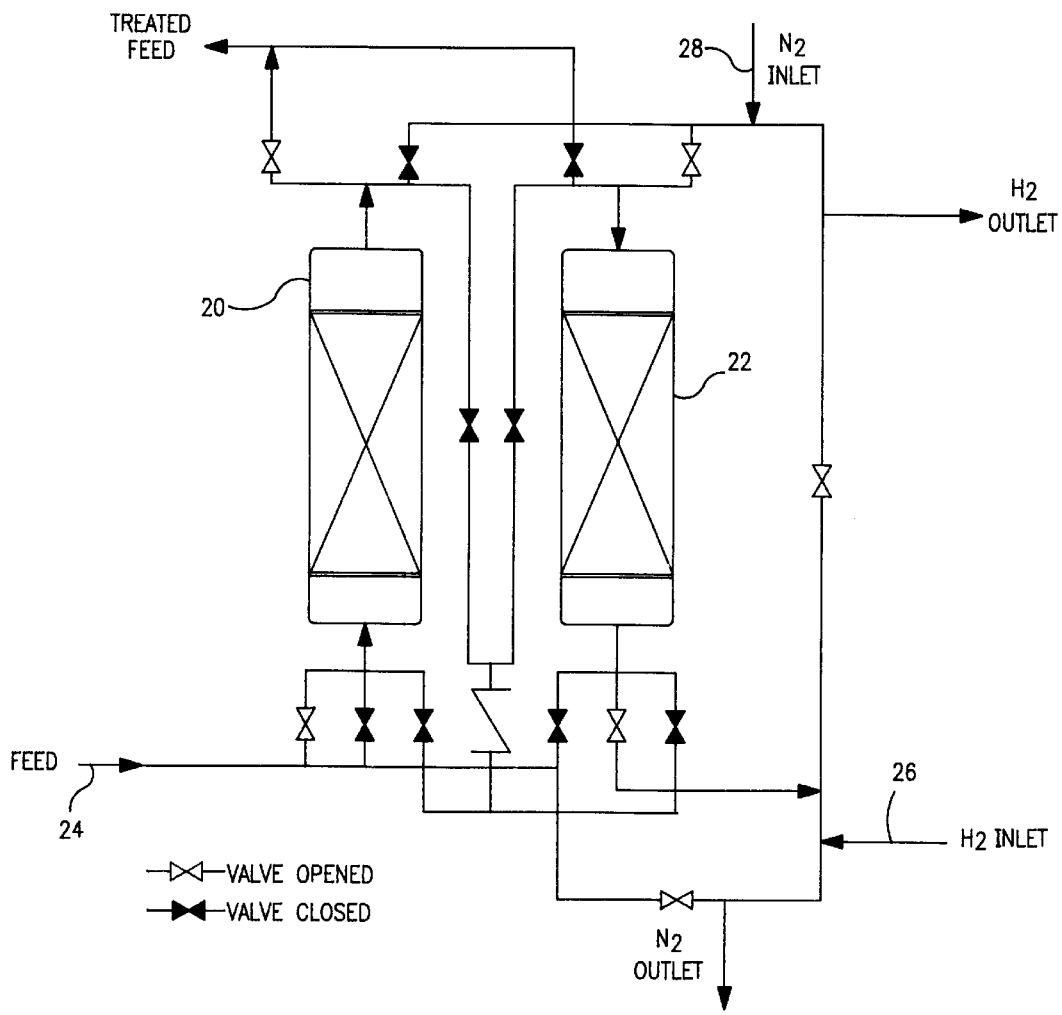
FIG. 5 shows a schematic illustration of a process for simultaneous selective hydrogenation of diolefins and nitriles in multiple reactor units in accordance with the present invention.

Referring now to FIG. 5, a process for simultaneous selective hydrogenation of diolefins and nitriles in accordance with the present invention is illustrated.

As shown, a first reactor 20 and a second reactor 22 may suitably be provided, and connected to a source 24 of feedstock, a source 26 of hydrogen, a source 28 of inert gas.

In accordance with the present invention, each reactor or reactor zone, 20, 22, is provided with catalyst in accordance with the present invention as described above. In accordance with the present invention, flow from source 24 of feedstock is preferably controlled so as to direct a feedstock hydrogen mixture or reaction feedstock to reactor zone 20 for treatment in the presence of catalyst in accordance with the present invention, while flow is also controlled through reactor zone 22 so as to first flush catalyst in reactor zone 22 with an inert gas, and then further flush or expose reactor zone 22 to a regenerating flow of hydrogen in accordance with the regeneration process of the present invention. Thus, while catalyst in first reactor zone 20 is used to treat reaction feedstock in accordance with the present invention, and is therefore also being gradually deactivated, catalyst in reactor zone 22 is being regenerated as discussed above, such that, advantageously, when catalyst in reactor zone 20 is deactivated to the point to where it is to be regenerated, flow of reaction feedstock can be diverted to reactor zone 22 and regenerated catalyst contained therein, while catalyst in reactor zone 20 is regenerated through flushing with inert gas and then with hydrogen in accordance with the present invention.

In FIG. 5, reactor zones 20, 22 are shown connected to sources 24, 26 and 28 of reaction feedstock, hydrogen and inert gas through a series of lines and valves adapted to control flow so as to alternatingly direct reaction feedstock to one reactor zone while the other zone is regenerated. FIG. 5 shows, the valves in an open/closed position for providing flow of reaction feedstock to reactor zone 20, and for providing flow of regenerating hydrogen to reactor zone 22. Operation in accordance with the present invention would be carried out in this configuration until catalyst in reactor zone 22 is sufficiently regenerated, and catalyst in reactor zone 20 is deactivated to the point it must be regenerated, at which time reaction feedstock is redirected to reactor zone 22, and inert gas followed by hydrogen are directed to reactor zone 20. In accordance with the process of the present invention, this sequence could be carried out alternatingly so as to provide for substantially continuous and non-interrupted hydrogenation. Of course, FIG. 5 provides an illustration of one configuration for carrying out the process, and numerous other configurations as well as more reactors or reactor zones could be employed.

The following examples illustrate the advantageous regeneration of a hydrogenation catalyst in accordance with the invention.

EXAMPLE 1

A 500 cc sample of nickel catalyst such as that described in U.S. Pat. No. 5,523,271 was loaded in a packed bed reactor of a pilot plant unit. A feedstock was provided which was a $C_5$ naphtha cut having the composition as set forth in Table 1 below.

TABLE 1

| COMPOSITION, wt % | |
|---|---|
| C3 | 0 |
| C4 | 2.92 |
| C4= | 6.98 |
| C5 | 38.25 |
| C5= | 25.56 |
| IC5= | 25.98 |
| C6+ | 0.40 |
| CONTAMINANTS | |
| DIOLEFINS, wt % | 1.9 |
| NITRILES, ppm v | |
| ACETONITRILES | 0.24 |
| PROPIONITRILES | 80.17 |
| BASIC NITROGEN, ppm wt | 1.45 |
| TOTAL SULFUR, ppm wt | 40 |
| MERCAPTANS, ppm wt | <1 |
| WATER, ppm wt | 150 |

The feedstock was mixed with hydrogen in a 2.8:1 molar ratio and fed up-flow to the pilot plant reactor. Hydrogenation is then carried out as set forth in U.S. Pat. No. 5,663,446. After 115 hours of operation, the conversion or activity for diolefin hydrogenation had decreased by less than about 5% of the original initial total conversion. At this point, the naphtha feed to the reactor was stopped, and a regeneration procedure in accordance with the present invention was commenced.

Initially, nitrogen was passed through the reactor in a down-flow direction, opposite to the flow of feedstock. The nitrogen was flowed through the reactor at a space velocity measured at standard conditions of 450 $h^{-1}$, and a surface velocity of 1500 cm/min, at room temperature for about 3 hours. This nitrogen flow advantageously had the effect of unbinding hydrocarbons from the surface of the hydrogenation catalyst. After the 3 hours of flow, nitrogen flow was stopped and a hydrogen flow was introduced into the reactor, in an up-flow direction, at a space velocity of 50 $h^{-1}$. The hydrogen was fed through the reactor at a temperature of 200° C. for 24 hours. After this treatment, the regeneration process according to the present invention was complete and the bed was restored to operation feeding a naphtha hydrogen reaction feedstock for treatment. The hydrogenation catalyst showed excellent regeneration in activity as shown in FIG. 2.

EXAMPLE 2

Figure 3:
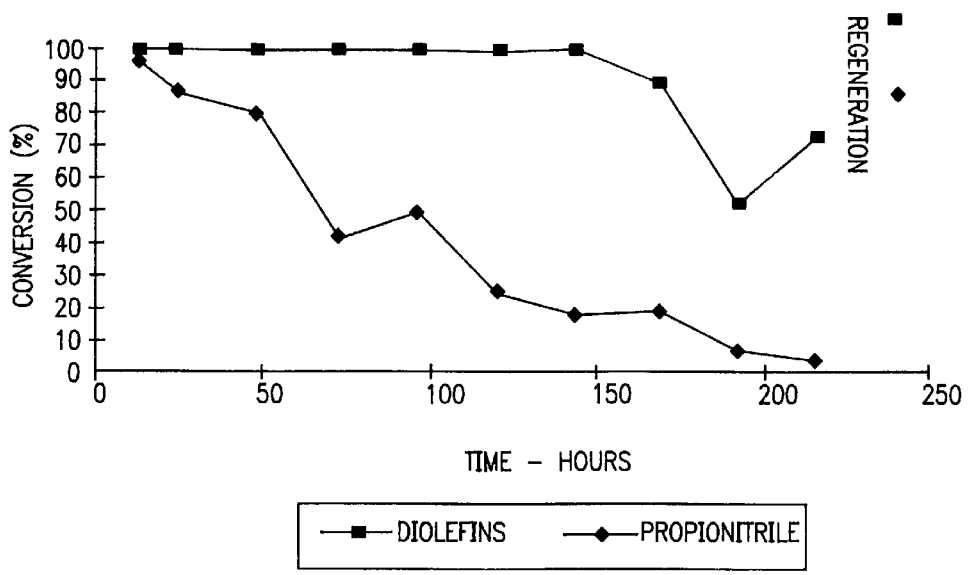
FIG. 3 illustrates the effect of regeneration according to the invention after significant deactivation of a catalyst, in accordance with the present invention.

The catalyst of Example 1 was subjected to the same hydrogenation reaction conditions and feedstock as described in Example 1, but the regeneration process was started when the hydrogenation catalyst illustrated a diolefin hydrogenation activity of about 30% and nitrile hydrogenation activity which was almost totally deactivated, after 220 hours of operation. The catalyst so deactivated was regenerated according to the present invention as described in Example 1. FIG. 3 illustrates the excellent regeneration of the catalyst even after such extreme deactivation and contamination over in excess of 200 hours of operation.

EXAMPLE 3

Figure 4:
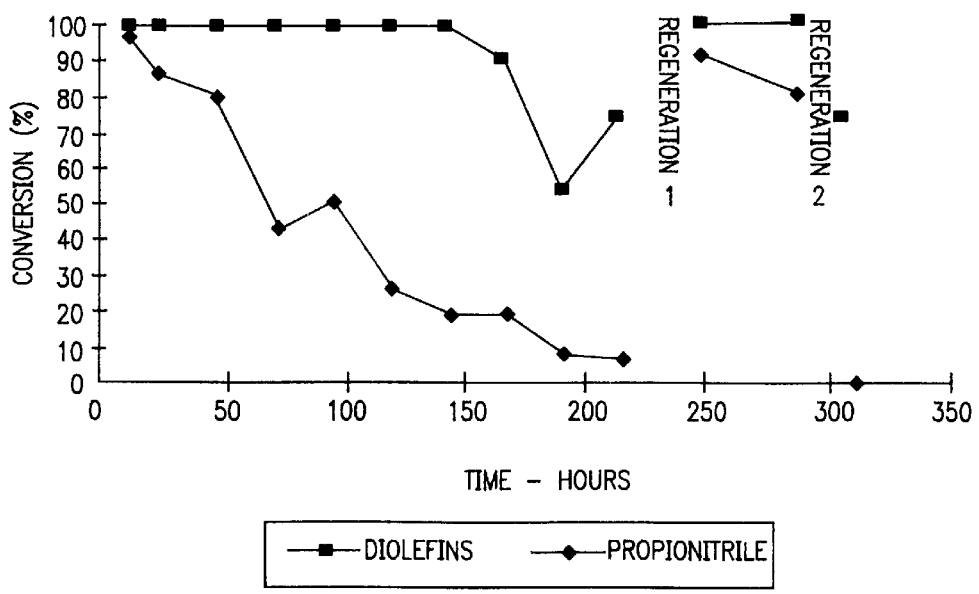
FIG. 4 further illustrates the activity over time of a catalyst regenerated in accordance with the present invention, and using only a hydrogen regeneration, so as to demonstrate the advantages of the process of the present invention.

The same catalyst as set forth in Example 1 was again subjected to the feedstock and hydrogenation reaction as described in Example 1. When the hydrogenation catalyst exhibited a deactivation similar to that in Example 1, a hydrogen treatment was started without an initial nitrogen flushing so as to remove naphtha and other hydrocarbons from the catalyst bed. FIG. 4 illustrates the initial operation, Regeneration No. 1 in accordance with Example 2, and the subsequent Regeneration No. 2 using only hydrogen as described above. As shown in the figure, regeneration using hydrogen only, without an initial nitrogen flushing, did not regenerate the hydrogenation catalyst. Thus, it is clear that the nitrogen flushing step of the process of the present invention serves advantageously to provide excellent regeneration of a hydrogenation catalyst in accordance with the invention.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for the simultaneous selective hydrogenation of diolefins and nitriles from a hydrocarbon feedstock, comprising the steps of:

(a) providing a hydrocarbon feedstock having a diolefin content of greater than or equal to about 0.1 wt % and a nitrile content of greater than or equal to about 2 ppm;

(b) providing at least a first and second reactor zone each containing a catalyst comprising a support material selected from the group consisting of inorganic oxide-zeolite composite, carbon and zeolite, and a catalytically active metal phase selected from the group consisting of partially reduced group IB metals and completely reduced group VIII metals, said metal phase being present in an amount of greater than or equal to about 0.03 wt %, said catalyst having an initial diolefin hydrogenation activity and said catalyst in said second reactor zone having a reduced diolefin hydrogenation activity;

(c) mixing said feedstock with hydrogen to provide a reaction feedstock having a ratio of hydrogen to diolefins and nitriles of less than about 3 times a stoichiometric amount required to selectively hydrogenate said diolefins and said nitrites;

(d) treating said reaction feedstock in the presence of said catalyst in said first reactor zone at hydrogenation temperature and pressure until said catalyst in said first reactor zone has a reduced diolefin hydrogenation activity not less than about 50% of said initial diolefin hydrogenation activity;

(e) flushing said catalyst in said second reactor zone with an inert gas in a first direction so as to remove traces of hydrocarbon from said catalyst and thereby provide a flushed catalyst in said second reactor zone;

(f) regenerating said flushed catalyst in said second reactor zone by further flowing said flushed catalyst with a reducing gas in a second direction substantially opposite said first direction so as to provide a regenerated catalyst in said second reactor zone having a regenerated diolefin hydrogenation activity which is greater than said reduced diolefin hydrogenation activity;

(g) treating said reaction feedstock in the presence of said catalyst in said second reactor zone at hydrogenation temperature and pressure until said catalyst has a reduced diolefin hydrogenation activity not less than about 50% of said initial diolefin hydrogenation activity;

(h) flushing said catalyst in said first reactor zone with an inert gas in a first direction so as to remove traces of hydrocarbon from said catalyst and thereby provide a flushed catalyst in said first reactor zone;

(i) regenerating said flushed catalyst in said first reactor zone by further flowing said flushed catalyst with a reducing gas in a second direction substantially opposite said first direction so as to provide a regenerated catalyst in said first reactor zone having a regenerated diolefin hydrogenation activity which is greater than said reduced diolefin hydrogenation activity; and (j) repeating steps (d) through (i).

2. A process according to claim 1, wherein said regenerating step provides said regenerated catalyst having said regenerated diolefin hydrogenation activity of at least about 90% of said initial diolefin hydrogenation activity.

3. A process according to claim 1, wherein said treating step is carried out until said reduced diolefin hydrogenation activity is not less than about 50% of said initial diolefin hydrogenation activity.

4. A process according to claim 3, wherein said treating step is carried out until said reduced diolefin hydrogenation activity is not less than about 80% of said initial diolefin hydrogenation activity.

5. A process according to claim 1, wherein said treating step comprises feeding said hydrocarbon feedstock to said catalyst in a feed direction, wherein said flushing step is carried out by feeding said inert gas substantially opposite to said feed direction, and wherein said regenerating step is carried out by feeding said reducing gas in said feed direction.

6. A process according to claim 1, wherein said flushing step and said regenerating step are carried out by sequentially feeding said inert gas and said reducing gas to said catalyst in substantially opposite directions.

7. A process according to claim 1, wherein steps (e) and (f) are carried out substantially simultaneously with step (d), and wherein steps (h) and (i) are carried out substantially simultaneously with step (g), whereby catalyst in one of the first and second reactor zones is flushed and regenerated while catalyst in the other of the first and second reactor zones is used to treat the reaction feedstock.

8. A process according to claim 1, wherein said inert gas flushing step is carried out at a temperature of less than or equal to about 300° C.

9. A process according to claim 1, wherein said inert gas flushing step is carried out at a temperature of between about subambient to about 300° C.

10. A process according to claim 1, wherein said inert gas flushing step is carried out at a temperature of between about room temperature to about 290° C.

11. A process according to claim 1, wherein said inert gas is selected from the group consisting of nitrogen, helium, argon, methane, ethane, propane and mixtures thereof.

12. A process according to claim 1, wherein said inert gas is nitrogen.

13. A process according to claim 1, wherein said regenerating step is carried out at a temperature of between about 100° C. to about 300° C.

14. A process according to claim 1, wherein said regenerating step is carried out at a pressure of between about 150 psi to about 650 psi.

15. A process according to claim 1, wherein said regenerating step comprises flushing said flushed catalyst with a volume of reducing gas of between about 5 to about 20 times an amount of reducing gas sufficient to substantially completely reduce said metal phase of said catalyst.

16. A process according to claim 1, wherein said flushing step is carried out at an inert gas space velocity of between about 100 to about 1000 h$^{-1}$.

17. A process according to claim 1, wherein said regenerating step is carried out at a reducing gas space velocity of between about 20 h$^{-1}$ to about 200 h$^{-1}$.

18. A process according to claim 1, wherein said reducing gas is hydrogen.

19. A process for the simultaneous selective hydrogenation of diolefins and nitrites from a hydrocarbon feedstock, comprising the steps of:

(a) providing a hydrocarbon feedstock having a diolefin content of greater than or equal to about 0.1 wt % and a nitrile content of greater than or equal to about 2 ppm;

(b) providing at least a first and second reactor zone each containing a catalyst comprising a support material selected from the group consisting of inorganic oxide-zeolite composite, carbon and zeolite, and a catalytically active metal phase selected from the group consisting of partially reduced group IB metals and completely reduced group VIII metals, said metal phase being present in an amount of greater than or equal to about 0.03 wt %, said catalyst having an initial diolefin hydrogenation activity and said catalyst in said second reactor zone having a reduced diolefin hydrogenation activity;

(c) mixing said feedstock with hydrogen to provide a reaction feedstock having a ratio of hydrogen to diolefins and nitrites of less than about 3 times a stoichiometric amount required to selectively hydrogenate said diolefins and said nitrites;

(d) treating said reaction feedstock in the presence of said catalyst in said first reactor zone at hydrogenation temperature and pressure until said catalyst in said first reactor zone has a reduced diolefin hydrogenation activity not less than about 50% of said initial diolefin hydrogenation activity;

(e) flushing said catalyst in said second reactor zone with an inert gas selected from the group consisting of nitrogen, helium, argon, methane, ethane, propane and mixtures thereof so as to remove traces of hydrocarbon from said catalyst and thereby provide a flushed catalyst in said second reactor zone;

(f) regenerating said flushed catalyst in said second reactor zone by further flowing said flushed catalyst with a reducing gas so as to provide a regenerated catalyst in said second reactor zone having a regenerated diolefin hydrogenation activity which is greater than said reduced diolefin hydrogenation activity;

(g) treating said reaction feedstock in the presence of said, catalyst in said second reactor zone at hydrogenation temperature and pressure until said catalyst has a reduced diolefin hydrogenation activity not less than about 50% of said initial diolefin hydrogenation activity;

(h) flushing said catalyst in said first reactor zone with an inert gas selected from the group consisting of nitrogen, helium, argon, methane, ethane, propane and mixtures thereof so as to remove traces of hydrocarbon from said catalyst and thereby provide a flushed catalyst in said first reactor zone;

(i) regenerating said flushed catalyst in said first reactor zone by further flowing said flushed catalyst with a reducing gas so as to provide a regenerated catalyst in said first reactor zone having a regenerated diolefin hydrogenation activity which is greater than said reduced diolefin hydrogenation activity; and (j) repeating steps (d) through (i).

* * * * *

UNITED STATES PATENT AND TRADEMARK OFFICE
CERTIFICATE OF CORRECTION

PATENT NO. : 5,877,364
DATED : MARCH 2, 1999
INVENTOR(S) : ZAIDA HERNANDEZ ET AL.

It is certified that error appears in the above-identified patent and that said Letters Patent is hereby corrected as shown below:

COLUMN 2, LINE 1, DELETE "NITRITES" AND INSERT --NITRILES--.

COLUMN 8, CLAIM 1, LINE 19, DELETE "NITRITES" AND INSERT --NITRILES--.

COLUMN 9, CLAIM 19, LINE 53, DELETE "NITRITES" AND INSERT --NITRILES--.

COLUMN 10, CLAIM 19, LINES 15 AND 17, DELETE "NITRITES" AND INSERT --NITRILES--.

COLUMN 10, CLAIM 19, LINE 37, DELETE THE "," AFTER "SAID".

Signed and Sealed this

Ninth Day of November, 1999

Attest:

Q. TODD DICKINSON

*Attesting Officer*       *Acting Commissioner of Patents and Trademarks*